United States Patent
Pallus et al.

(10) Patent No.: US 10,440,031 B2
(45) Date of Patent: Oct. 8, 2019

(54) WIRELESS NETWORK STEERING

(71) Applicant: Cisco Technology, Inc., San Jose, CA (US)

(72) Inventors: Derrick Pallus, San Francisco, CA (US); Eric Maassmann, San Francisco, CA (US); Simon Barber, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 103 days.

(21) Appl. No.: 15/656,184

(22) Filed: Jul. 21, 2017

(65) Prior Publication Data
US 2019/0028482 A1 Jan. 24, 2019

(51) Int. Cl.
| | |
|---|---|
| *H04L 29/06* | (2006.01) |
| *H04W 48/14* | (2009.01) |
| *H04W 48/16* | (2009.01) |
| *H04W 12/08* | (2009.01) |
| *H04W 4/21* | (2018.01) |

(Continued)

(52) U.S. Cl.
CPC ............ *H04L 63/105* (2013.01); *H04L 63/08* (2013.01); *H04L 63/20* (2013.01); *H04W 4/21* (2018.02); *H04W 12/08* (2013.01); *H04W 48/00* (2013.01); *H04W 48/14* (2013.01); *H04W 48/16* (2013.01); *H04L 67/36* (2013.01); *H04W 12/0051* (2019.01); *H04W 48/02* (2013.01);
(Continued)

(58) Field of Classification Search
None
See application file for complete search history.

(56) References Cited

U.S. PATENT DOCUMENTS

| | | | |
|---|---|---|---|
| 4,236,068 | A | 11/1980 | Walton |
| 5,642,303 | A | 6/1997 | Small et al. |

(Continued)

FOREIGN PATENT DOCUMENTS

| | | |
|---|---|---|
| WO | WO 2013/020126 | 2/2013 |
| WO | WO 2014/098556 | 6/2014 |
| WO | WO 2018/009340 | 1/2018 |

OTHER PUBLICATIONS

Afolabi, Ibrahim, et al., "Network Slicing & Softwarization: A Survey on Principles, Enabling Technologies & Solutions," Mar. 21, 2018, pp. 1-24.

(Continued)

*Primary Examiner* — Saleh Najjar
*Assistant Examiner* — Michael W Chao
(74) *Attorney, Agent, or Firm* — Polsinelli PC

(57) ABSTRACT

Systems, methods, and computer-readable media for steering authorized wireless clients to preferred or restricted wireless networks. In some examples, an access point associated with a preferred wireless network and a non-preferred wireless network can receive one or more probe requests from a wireless client. The access point can withhold a response to the one or more probe requests from the wireless client until a probe response triggering event is detected. In response to detecting the probe response triggering event, the access point can steer the wireless client towards the wireless network by sending, to the wireless client, a first probe response associated with the preferred wireless network and withholding a second probe response associated with the non-preferred wireless network.

17 Claims, 9 Drawing Sheets

(51) Int. Cl.
*H04W 48/00* (2009.01)
*H04L 29/08* (2006.01)
*H04W 48/02* (2009.01)
*H04W 48/18* (2009.01)
*H04W 84/12* (2009.01)
*H04W 88/10* (2009.01)
*H04W 12/00* (2009.01)

(52) U.S. Cl.
CPC ............ *H04W 48/18* (2013.01); *H04W 84/12* (2013.01); *H04W 88/10* (2013.01)

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,400,901 | B2 * | 7/2008 | Kostic .................... H04L 47/10 370/236 |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,458,184 | B2 | 6/2013 | Dorogusker et al. |
| D691,636 | S | 10/2013 | Bunton |
| 8,549,638 | B2 | 10/2013 | Aziz |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| D757,424 | S | 5/2016 | Phillips et al. |
| D759,639 | S | 6/2016 | Moon et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| D776,634 | S | 1/2017 | Lee et al. |
| 9,544,337 | B2 | 1/2017 | Eswara et al. |
| 9,609,504 | B2 | 3/2017 | Karlqvist et al. |
| 9,642,167 | B1 | 5/2017 | Snyder et al. |
| 9,654,344 | B2 | 5/2017 | Chan et al. |
| 9,713,114 | B2 | 7/2017 | Yu |
| 9,772,927 | B2 | 9/2017 | Gounares et al. |
| 9,820,105 | B2 | 11/2017 | Snyder et al. |
| D804,450 | S | 12/2017 | Speil et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu et al. |
| 9,923,780 | B2 | 3/2018 | Rao et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 10,299,198 | B2 * | 5/2019 | Calcev .................... H04W 76/10 |
| 2003/0087645 | A1 | 5/2003 | Kim et al. |
| 2003/0116634 | A1 | 6/2003 | Tanaka |
| 2004/0203572 | A1 | 10/2004 | Aerrabotu et al. |
| 2005/0090225 | A1 | 4/2005 | Muehleisen et al. |
| 2005/0147073 | A1 * | 7/2005 | Hietalahti ............... H04W 4/00 370/338 |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0165103 | A1 * | 7/2006 | Trudeau .............. H04L 12/2854 370/401 |
| 2006/0187866 | A1 | 8/2006 | Werb et al. |
| 2007/0037605 | A1 | 2/2007 | Logan |
| 2007/0239854 | A1 | 10/2007 | Janakiraman et al. |
| 2007/0243888 | A1 * | 10/2007 | Faccin ................. H04W 48/14 455/461 |
| 2008/0037715 | A1 | 2/2008 | Prozeniuk et al. |
| 2008/0075053 | A1 * | 3/2008 | Soneda ................. H04W 28/08 370/338 |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0022068 | A1 * | 1/2009 | Iyer ..................... H04L 41/0806 370/254 |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2012/0023552 | A1 | 1/2012 | Brown et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0287783 | A1 * | 11/2012 | Kuhn ..................... H04W 16/08 370/230 |
| 2012/0311127 | A1 | 12/2012 | Kandula et al. |
| 2012/0324035 | A1 | 12/2012 | Cantu et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0188628 | A1 * | 7/2013 | Lee ..................... H04W 48/14 370/338 |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0294270 | A1 * | 11/2013 | Yang .................... H04W 48/16 370/252 |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0052508 | A1 | 2/2014 | Pandey et al. |
| 2014/0059655 | A1 | 2/2014 | Beckley et al. |
| 2014/0064245 | A1 * | 3/2014 | Abraham ............... H04W 72/10 370/331 |
| 2014/0087693 | A1 | 3/2014 | Walby et al. |

(56) References Cited

U.S. PATENT DOCUMENTS

| | | | |
|---|---|---|---|
| 2014/0105213 | A1 | 4/2014 | A K et al. |
| 2014/0118113 | A1 | 5/2014 | Kaushik et al. |
| 2014/0148196 | A1 | 5/2014 | Bassan-Eskenazi et al. |
| 2014/0179352 | A1 | 6/2014 | V.M. et al. |
| 2014/0191868 | A1 | 7/2014 | Ortiz et al. |
| 2014/0198808 | A1 | 7/2014 | Zhou |
| 2014/0233460 | A1 | 8/2014 | Pettus et al. |
| 2014/0269321 | A1 | 9/2014 | Kamble et al. |
| 2014/0302869 | A1 | 10/2014 | Rosenbaum et al. |
| 2014/0307545 | A1* | 10/2014 | Lee .................. H04W 52/0206 370/230 |
| 2014/0337824 | A1 | 11/2014 | St. John et al. |
| 2014/0341568 | A1 | 11/2014 | Zhang et al. |
| 2014/0355523 | A1* | 12/2014 | Congdon .............. H04W 48/12 370/328 |
| 2015/0016286 | A1 | 1/2015 | Ganichev et al. |
| 2015/0016469 | A1 | 1/2015 | Ganichev et al. |
| 2015/0029922 | A1* | 1/2015 | Zheng ............... H04W 52/0216 370/311 |
| 2015/0030024 | A1 | 1/2015 | Venkataswami et al. |
| 2015/0043581 | A1 | 2/2015 | Devireddy et al. |
| 2015/0063166 | A1 | 3/2015 | Sif et al. |
| 2015/0065161 | A1 | 3/2015 | Ganesh et al. |
| 2015/0087330 | A1 | 3/2015 | Prechner et al. |
| 2015/0103818 | A1 | 4/2015 | Kuhn et al. |
| 2015/0163192 | A1 | 6/2015 | Jain et al. |
| 2015/0172391 | A1 | 6/2015 | Kasslin et al. |
| 2015/0223337 | A1 | 8/2015 | Steinmacher-Burow |
| 2015/0256972 | A1 | 9/2015 | Markhovsky et al. |
| 2015/0264519 | A1 | 9/2015 | Mirzaei et al. |
| 2015/0271829 | A1* | 9/2015 | Amini .................. H04W 24/02 370/329 |
| 2015/0280827 | A1 | 10/2015 | Adiletta et al. |
| 2015/0288410 | A1 | 10/2015 | Adiletta et al. |
| 2015/0326704 | A1 | 11/2015 | Ko et al. |
| 2015/0358777 | A1 | 12/2015 | Gupta |
| 2015/0362581 | A1 | 12/2015 | Friedman et al. |
| 2016/0007315 | A1 | 1/2016 | Lundgreen et al. |
| 2016/0044627 | A1 | 2/2016 | Aggarwal et al. |
| 2016/0099847 | A1 | 4/2016 | Melander et al. |
| 2016/0105408 | A1 | 4/2016 | Cooper et al. |
| 2016/0113055 | A1* | 4/2016 | Fan ....................... H04W 76/18 370/329 |
| 2016/0127875 | A1 | 5/2016 | Zampini, II |
| 2016/0146495 | A1 | 5/2016 | Malve et al. |
| 2016/0212695 | A1* | 7/2016 | Lynch .................. H04W 48/08 |
| 2016/0249267 | A1* | 8/2016 | Ho ........................ H04W 76/10 |
| 2016/0249287 | A1* | 8/2016 | Xie ....................... H04L 9/0631 |
| 2016/0344641 | A1 | 11/2016 | Javidi et al. |
| 2017/0026974 | A1 | 1/2017 | Dey et al. |
| 2017/0111821 | A1* | 4/2017 | Sivakumar ........... H04W 28/08 |
| 2017/0214551 | A1 | 7/2017 | Chan et al. |
| 2017/0238239 | A1* | 8/2017 | Ong ...................... H04W 48/18 370/338 |
| 2018/0069311 | A1 | 3/2018 | Pallas et al. |
| 2018/0084389 | A1 | 3/2018 | Snyder et al. |
| 2018/0183806 | A1* | 6/2018 | Nambisan ............... H04L 29/06 |
| 2019/0173871 | A1* | 6/2019 | Venkatanaranappa ........................ H04L 63/0815 |

OTHER PUBLICATIONS

Antonioli, Roberto, et al., "Dual Connectivity for LTE-NR Cellular Networks," Research Gate, Sep. 3-6, 2017, pp. 171-175.
Cisco ASR 5x00 Mobility Management Entity Administration Guide, Version 15.0, Last updated Jun. 13, 2014, Cisco, 1-266.
Cox, Jacob H. Jr., et al., "Advancing Software-Defined Networks: A Survey," IEEE, Oct. 12, 2017, pp. 25487-25526.
Saraiva de Sousa, Nathan F., et al., "Network Service Orchestration: A Survey," IEEE Communications Surveys & Tutorials, Mar. 23, 2018, pp. 1-30.
Geller, Michael, et al. , "5G Security Innovation with Cisco," Whitepaper Cisco Public, Jun. 8, 2018, pp. 1-29.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
"I Love WiFi, The difference between L2 and L3 Roaming Events," Apr. 1, 2010, 6 pages.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cisco Systems, Inc., "Wi-FI Location-Based Services 4.1 Design Guide," May 20, 2008, 206 pages.
Cui, Wenzhi et al., "DiFS: Distributed Flow Scheduling for Data Center Networks," Nanjing University, China, Jul. 28, 2013, 10 pages.
Galvan T., Carlos E., et al., "Wifi bluetooth based combined positioning algorithm," International Meeting of Electrical Engineering Research ENIIVIE 2012, Procedia Engineering 35 (2012 ), pp. 101-108.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Network Heresy, "NVGRE, VXLAN and What Microsoft is Doing Right," Oct. 3, 2011, 5 pages.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

* cited by examiner

WIRELESS NETWORK STEERING

The present technology pertains to wireless networking, and more specifically to steering authorized wireless clients to restricted wireless networks.

BACKGROUND

Wireless networks allow users to conveniently access a network from their wireless devices. Thus, wireless networks can be implemented to extend the reach and functionality of a physical network. Wireless networks can also be used to provide different levels of security and access to a network. In many cases, different wireless networks are used to separate users, devices, and resources in the network. For example, a guest wireless network can provide unauthenticated users with limited network or Internet connectivity, and a separate, restricted wireless network can provide authenticated users access to additional resources on the network. A single wireless client can also have access to more than one wireless network. Here, the wireless client can select a specific wireless network available and connect to the selected wireless network. If necessary, the wireless client may be required to provide specific credentials for the selected wireless network.

For convenience, wireless clients generally cache the names of wireless networks known to the client, and often store preferences used by the client to automatically identify and select a wireless network in the area and establish connectivity. A client's ability to remember wireless networks and automatically select or favor a specific network is intended to limit the user's involvement in reconnecting to a wireless network. This functionality can be convenient for users, particularly when having to connect to different wireless networks. However, in many cases, this convenience can lead to user confusion and device misconfiguration. For example, a client may automatically connect to a guest wireless network unbeknownst to the user. The guest wireless network may have limited access to the network, which would prevent the user from accessing restricted resources. The user may then get an error when trying to access a restricted resource, and fail to recognize the underlying cause of the error. The user may spend unnecessary time trying to fix the problem, and even generate a support case. Over time, this can lead to multiple support cases which place an additional burden on the network support staff.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
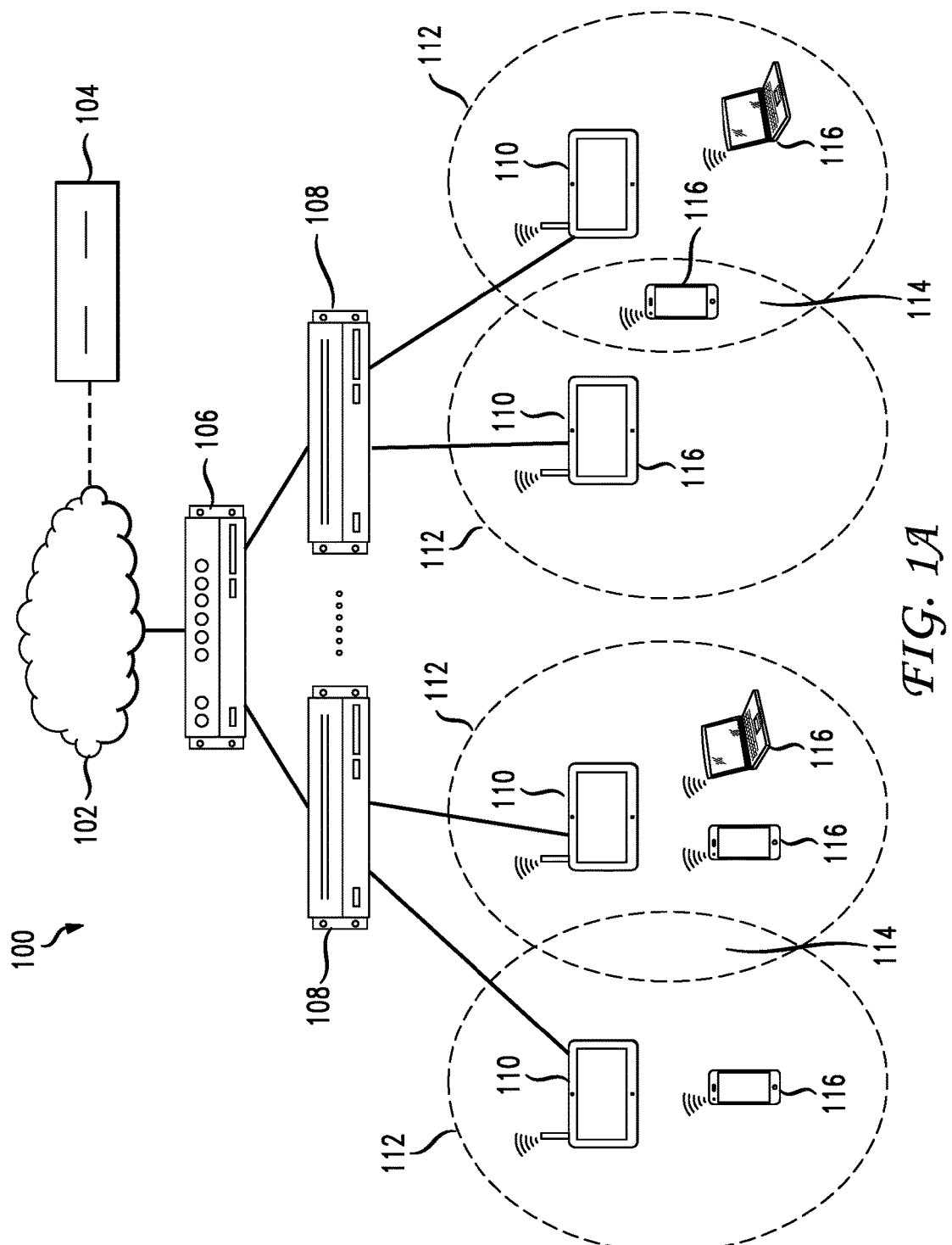
FIG. 1A illustrates an example wireless network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for intelligently steering known or authorized clients to specific wireless networks. In some examples, an access point associated with multiple wireless networks can be configured to steer clients to a preferred or specific wireless network, such as a restricted wireless network, over a non-preferred wireless network, such as a guest wireless network, when such clients are known or authorized for the preferred or specific wireless network. For example, an access point can be associated with a preferred wireless network and a non-preferred wireless network. The access point can receive one or more probe requests from a wireless client and withhold a response to the wireless client until the access point detects a probe response triggering event. In response to detecting the probe response triggering event, the access point can steer the wireless client towards the preferred wireless network by sending, to the wireless client, a first probe response associated with the preferred wireless network and withholding a second probe response associated with the non-preferred wireless network.

The probe response triggering event can allow the access point to identify when to respond to the wireless client and how to respond in order to steer the wireless client to a specific wireless network. For example, the probe response triggering event can be a determination that the wireless client is authorized for a restricted wireless network, which can be the preferred wireless network. Thus, the access point can perform an authorization check, and a determination that the wireless client is authorized for the restricted wireless network can trigger the access point to respond specifically for the restricted wireless network. The probe response triggering event may consequently allow the access point to steer the wireless client toward the restricted wireless network since the wireless client is known to be properly authorized, while limiting the wireless client's opportunity to instead select and join the guest wireless network.

As another example, the probe triggering event can result from receiving a threshold number of probe requests from the wireless client. Accordingly, the access point can withhold a probe response to the wireless client for both the restricted wireless network and the guest wireless network to prevent the wireless client from accessing an unintended wireless network, and after receiving a number of probe requests it can respond first for the restricted wireless network. The number of probe requests that trigger the first response can provide some delay for intelligently steering the wireless client without exceeding a timing constraint. The access point can be configured to subsequently respond for any other wireless networks, such as a non-preferred or guest wireless network, if it receives a number of additional probe requests from the wireless client. This way, the access point can enable the wireless client to access other wireless networks if otherwise unable to access the restricted or preferred wireless network.

Description

Network operators can deploy multiple wireless networks in a same location, such as a building or a campus. The wireless networks can be deployed with varying degrees of security and access restrictions. For example, a guest wireless network can be deployed in an office to provide Internet connectivity and/or limited network access to office guests, and a restricted wireless network can be deployed in the office to provide authorized users with access to additional network resources. Additional restricted and/or open wireless networks can also be deployed in the office as desired.

Restricted wireless networks, such as corporate wireless networks, generally allow users to access restricted network resources but require some level of authentication, while guest wireless networks have limited—if any—authorization requirements but also limit or restrict access to network resources. Accordingly, guest and other unrestricted wireless networks are generally easier for users to access. As a result, users often access guest and other unrestricted wireless networks by default or when wanting to circumvent the authentication requirements of the more restricted wireless networks available in the area. Many times, a new client may even join the guest wireless network before, or as a step for, being authorized to access the more restricted wireless network(s) in the area.

For example, a college may deploy a guest wireless network that provides Internet connectivity and is open to the public, as well as a restricted wireless network which users can access via, for example, IEEE (Institute of Electrical and Electronics Engineers) 802.1x, after establishing credentials at the college library. Prior to establishing credentials for the restricted wireless network, a user may join the guest wireless network to gain Internet connectivity. However, if the user's client device caches the guest wireless network's information, such as the SSID (service set identifier) of the guest wireless network, the client device may treat the guest wireless network as a preferred network in the future. As a result, when the user later tries to wirelessly connect to the network, the user's client device may prefer or automatically select the guest wireless network over the restricted wireless network or any other wireless networks available. The client device may thus connect to the guest wireless network even if the user intended to connect to the restricted wireless network.

In many cases, the user may not even recognize that the client device has instead connected to the guest wireless network, and may encounter an error when trying to access restricted resources. Consequently, the user may be prevented from accessing needed resources on the network despite having the appropriate credentials for those resources. The user may eventually generate a support case requesting assistance from the network support staff.

The disclosed technology addresses the need in the art for accurate and intelligent steering of wireless clients when multiple wireless networks are available in an area. The present technology involves system, methods, and computer-readable media for intelligent steering of wireless clients to specific wireless networks. Thus, the approaches set forth herein can intelligently steer client devices to specific wireless networks when establishing wireless connectivity in an area. This intelligent steering of clients can prevent or significantly reduce errors and support cases in environments having multiple wireless networks, as previously described, thereby improving the user's experience and reducing the burden on the network support staff.

Figure 1B:
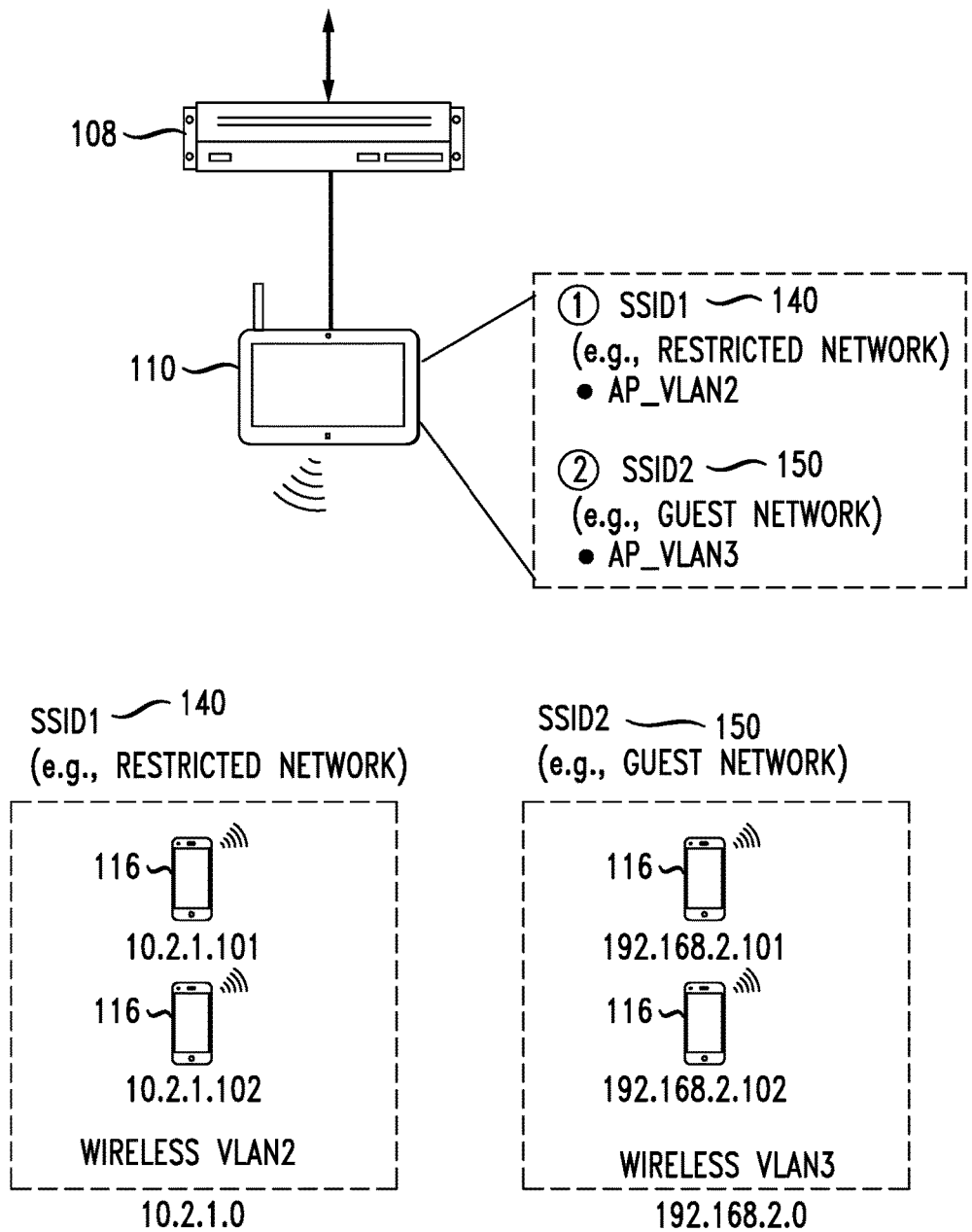
FIG. 1B illustrates a diagram of example wireless networks deployed on the example network environment shown in FIG. 1A.
Figure 6:
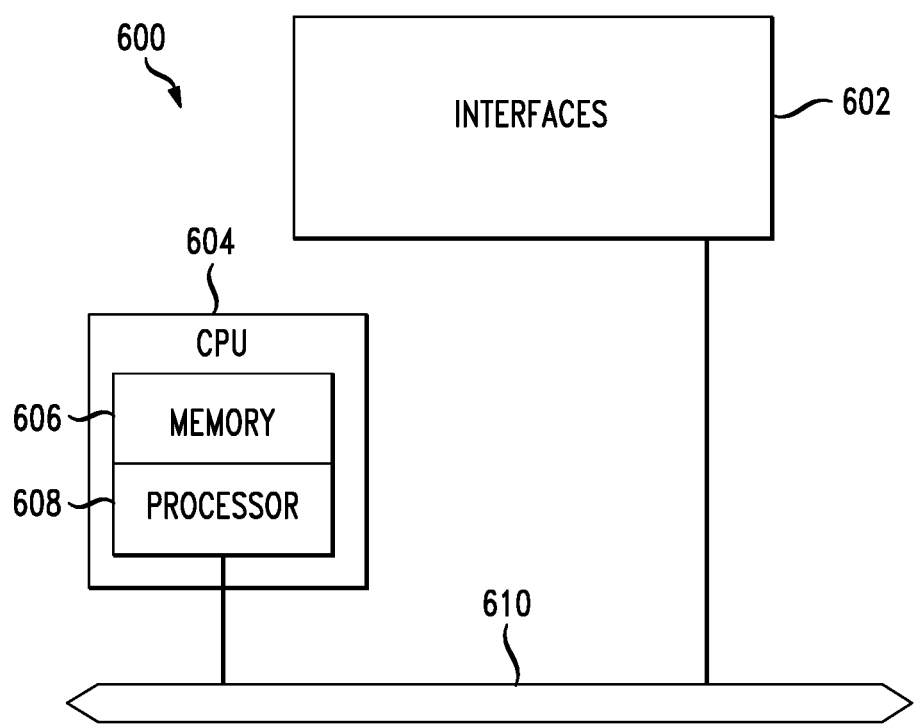
FIG. 6 illustrates an example network device.
Figure 7:
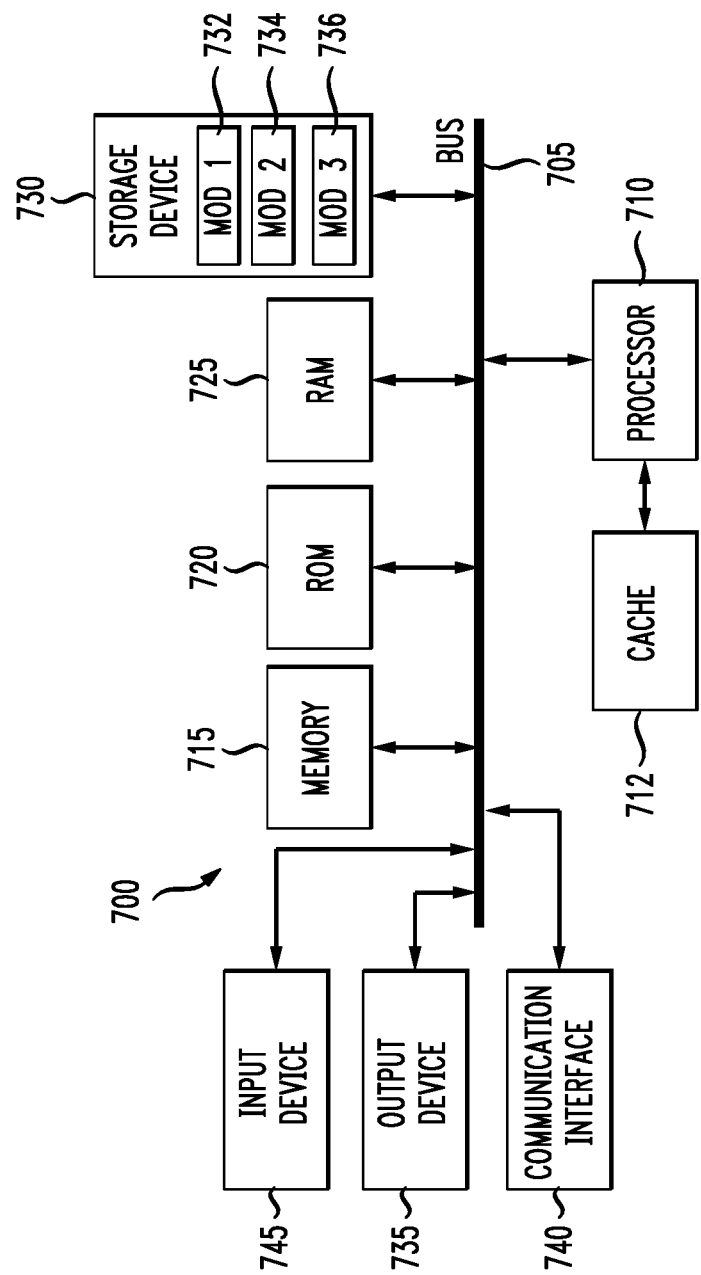
FIG. 7 illustrates an example computing device.

The present technology will be described in the following disclosure as follows. The discussion begins with an introductory discussion of example wireless network environments, as illustrated in FIGS. 1A-B. A discussion of systems and methods for steering authorized wireless clients, as shown in FIGS. 2 through 5, will then follow. The discussion concludes with a description of example computing and network devices, as illustrated in FIGS. 6 and 7, including example hardware components suitable for hosting software applications and performing computing operations. The disclosure now turns to FIG. 1A.

FIG. 1A illustrates an example wireless network environment 100. The wireless network environment 100 includes access points (APs) 110 for wirelessly connecting wireless clients 116 to the network environment. APs 110 can include hardware and software for transmitting and receiving wireless signals from other devices and supporting wireless communications and connectivity. Moreover, the APs 110 can broadcast one or more wireless networks deployed on the APs 110, allow the wireless clients 116 to access the one or more wireless networks, and bridge or route communications between the wireless clients 116 on the one or more wireless networks and the physical network(s), including other devices in and out of the network environment 100. In some cases, the APs 110 can broadcast the one or more wireless networks deployed on the APs 110 by transmitting the names or service set identifiers (SSIDs) of the one or more wireless networks. The APs 110 can also broadcast other information about the one or more wireless networks, such as channel information, band information, etc.

The APs 110 can have a respective range 112 for transmitting and/or receiving wireless communications. Those of the wireless clients 116 within the respective range 112 of an AP can communicate wirelessly with that AP and maintain such communications as they move within the respective range 112. In some cases, the APs 110 can be positioned such that the respective range 112 of two or more APs 110 can overlap to form an overlapping range 114. Moreover, the APs 110 can be position within communicative range of each other to create a mesh network configuration. The overlapping range 114 and/or mesh network configuration can allow a wireless client to roam outside the respective range of the AP that the wireless client is connected to, and experience minimal to no loss in connectivity. For example, a wireless client connected to AP1 can roam outside of the respective range of AP1 and into the respective range of AP2, and maintain connectivity through AP2. Thus, the wireless client can seamlessly hop from one AP to another during a communication session in order to avoid or limit service disruptions when the wireless client moves beyond the respective range of an AP.

For example, as a wireless client begins to roam toward the limits of an APs respective range, the wireless client may eventually reach an overlapping range 114 which places the wireless client within the respective range of multiple APs, thus allowing the wireless client to transmit and receive wireless signals from those APs 110 associated with the overlapping range 114. The wireless client can hop from one AP associated with the overlapping range to another AP associated with the overlapping range, and maintain connectivity (or limit disruption) as the wireless client roams outside of the respective range of one AP and into the respective range of another AP. The overlapping ranges 114 can provide zones for a "handoff" between APs, where connectivity with a wireless client is transferred from one AP to a different AP in order to continue the wireless clients' wireless communications via the different AP. Thus, the wireless clients 116 can move between respective ranges 112 and maintain wireless connectivity to the network environment 100.

The APs 110 can each be configured to service a single wireless network or multiple wireless networks. Each wireless network deployed on an AP can have a respective SSID which identifies the wireless network. For example, one or more of the APs 110 can provide connectivity to a first wireless network having a "Guest" SSID and a second wireless network having a "Restricted" SSID. The wireless clients 116 can connect to the Guest SSID or the Restricted SSID via those APs 110. Moreover, multiple APs 110 can host a same wireless network or SSID, but may also host other wireless networks or SSIDs. For example, all APs 110 may host a guest wireless network (e.g., Guest SSID), while only one or more APs 110 may host a specific, restricted wireless network (e.g., Restricted SSID).

Each wireless network can have one or more configuration settings defined for that wireless network based on the specific requirements or purpose of the wireless network. Non-limiting examples of configuration settings for wireless networks can include a communication channel, a band, an authentication requirement or mechanism (e.g., authorization enforced via a device's media access control (MAC) address, a remote authentication dial-in user service (RADIUS), a preshared key (PSK), 802.1x credentials, etc.), network access restrictions (e.g., which portions and/or resources of a network can be accessed, etc.), security or group policies (e.g., access control list configurations, etc.), network configurations (e.g., subnet, virtual LAN (VLAN), communication protocols, port forwarding, traffic filtering, etc.), etc.

In some cases, the configuration and location of wireless networks and APs 110 can vary based on one or more factors, such as network requirements, geography, policies, physical restrictions, organizational structure, business factors, inter-office politics, etc. To illustrate, a wireless network associated with the SSID "Restricted Business Department" may be configured specifically to address the networking needs and authorization levels of users in the business department and/or may be deployed on APs located in the office of the business department, while a wireless network associated with the SSID "Guest Network" may be open to all users and hosted by all APs 100 in the network environment 100. Thus, different wireless networks, which can be represented by respective SSIDs, can be configured to separate users, clients, resources, and other aspects of a network.

The APs 110 can connect to nodes 108 to communicate with the physical network as well as other devices inside or outside of the network environment. The nodes 108 can be, for example, Layer 2 and/or Layer 3 network devices, such as switches or routers. In some cases, the APs 110 can communicatively couple to the nodes 108 via a physical link (e.g., wire or cable) between a respective port/interface on the APs 110 and a respective port/interface on the nodes 108.

The nodes 108 can also connect to other network devices in the network. For example, the nodes 108 can connect to a router 106 which can route communications to and from other networks and devices, such as network 102. Thus, traffic to and from the wireless clients 116 and other networks, such as network 102, can flow through the router 106, nodes 108, and APs 110, and wirelessly between the wireless clients 116 and APs 110.

The network 102 can include a private network, such as a local area network (LAN) or a private cloud; a public network such as the Internet or a public cloud; and/or a hybrid network such as a virtual private network (VPN), a hybrid cloud, etc. In some cases, the network 102 can be a cloud configured to communicate with the network environment 100 through the router 106 to provide one or more services (e.g., firewall services, intrusion detection services, infrastructure services, management services, monitoring services, authentication services, backup services, configuration or automation services, etc.) to any of the devices 106, 108, 110, and 112 in the network environment 100.

For example, the network 102 can be a cloud configured to monitor and manage network configurations and conditions in the network environment 100. The network 102 can include one or more physical and/or virtual devices configured to provide services, such as monitoring and configuration management services, to devices in the network environment 100. To illustrate, the network 102 can include a controller 104 configured to provide authentication, authorization, and accounting (AAA) services and/or other networking services for the wireless clients 116 and the network environment 100.

FIG. 1B illustrates a diagram of example wireless networks deployed on the network environment 100. In this example, the AP 110 is configured to host multiple wireless networks, represented in this example by $SSID_1$ 140 and $SSID_2$ 150. $SSID_1$ 140 is a restricted wireless network, which may require user authentication for access and may provide access to restricted network resources (e.g., printers, shares, files, databases, applications, intranet, etc.) upon access. $SSID_2$ 150 is a guest wireless network that is open to all users and/or available with limited authentication requirements. For the sake of clarity and explanation purposes, $SSID_1$ 140 will be referenced herein as "Restricted $SSID_1$ 140", and $SSID_2$ 150 will be referenced herein as "Guest $SSID_2$ 150".

Given the reduced authentication and security requirements of the Guest $SSID_2$ 150, access to network resources in the network environment 100 from the Guest $SSID_2$ 150 may be limited, such as access to printers, shares, files, databases, applications, intranet, etc. In some cases, the Guest $SSID_2$ 150 may only provide Internet connectivity, and thus may restrict access to all other network resources. For example, the Guest $SSID_2$ 150 can provide a means for unauthenticated users and guests to access the Internet from their wireless devices for convenience, while preventing unauthenticated users from accessing other resources on the network.

In some cases, the Restricted $SSID_1$ 140 and Guest $SSID_2$ 150 can have different network addressing configurations in order to segregate traffic and users between the wireless networks. For example, the Restricted $SSID_1$ 140 and Guest $SSID_2$ 150 can reside on different VLANs, subnets, etc. The wireless clients 116 can connect to the Restricted $SSID_1$ 140 or Guest $SSID_2$ 150 via the AP 110. As previously mentioned, the network configurations, security, policies, authentication, etc., applied to the wireless clients 116 will depend on which of the Restricted $SSID_1$ 140 or the Guest $SSID_2$ 150 they connect to.

Figure 2:
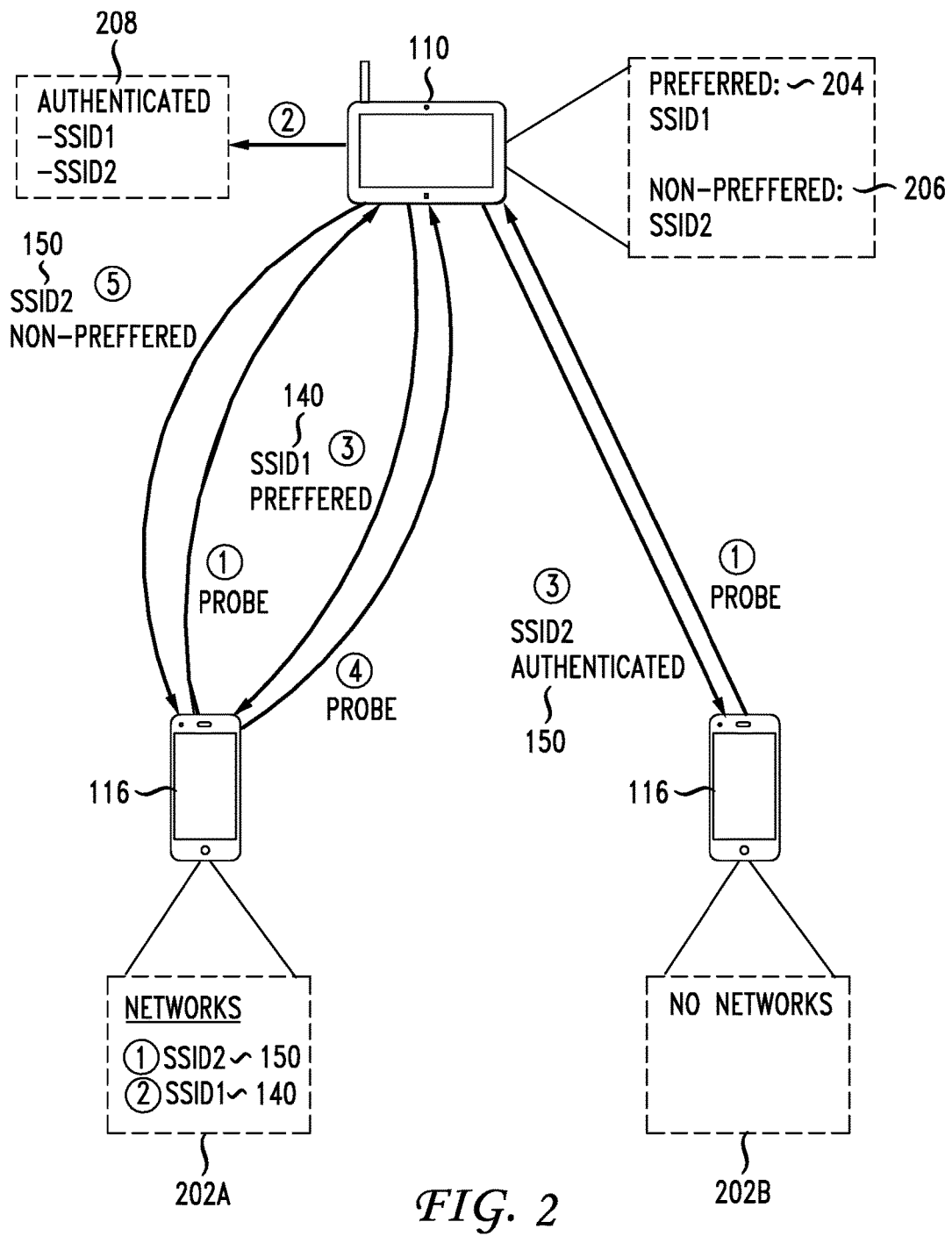
FIG. 2 illustrates a diagram of a process for connecting and steering wireless clients to specific wireless networks on a wireless network environment.

FIG. 2 illustrates a diagram of a process for connecting and steering the wireless clients 116 to specific wireless networks deployed on the AP 110. As previously mentioned, the AP 110 can host different wireless networks, such as the Restricted $SSID_1$ 140 and Guest $SSID_2$ 150. Thus, in this example, the AP 110 can broadcast the Restricted $SSID_1$ 140 and the Guest $SSID_2$ 150 for the wireless clients 116.

Assume the Restricted $SSID_1$ 140 can provide access to restricted network resources as well as Internet connectivity, while the Guest $SSID_2$ 150 provides Internet connectivity but no access to restricted resources. The Restricted $SSID_1$ 140 and Guest $SSID_2$ 150 may have different access control policies, authorization requirements, etc. For example, the Guest $SSID_2$ 150 may be open to unauthenticated users or may use a pre-shared key (PSK), while the Restricted $SSID_1$ 140 may require MAC-based authorization or 802.1x credentials for access.

The AP 110 can make preference decisions for the Restricted $SSID_1$ 140 and Guest $SSID_2$ 150 on a client or AP level. For example, the AP 110 can treat the Restricted $SSID_1$ 140 as a preferred wireless network (as between the Restricted $SSID_1$ 140, the Guest $SSID_2$ 150 and/or any other wireless networks) for some clients, and the Guest $SSID_2$ 150 as the preferred wireless network for other clients. The AP 110 can use such preferences to prefer or prioritize a wireless network over one or more other wireless networks and steer wireless accordingly, as further described below. The AP 110 can make such preference determinations on a client level based on one or more factors, such as a known client authorization or network affiliation, a history of the wireless client, a record of connection failures and/or successes associated with the wireless client, etc.

As previously noted, the AP 110 can also make such preference determinations on an AP level. For example, the Restricted $SSID_1$ 140 and Guest $SSID_2$ 150 can be marked or set as preferred or non-preferred on the AP 110. To illustrate, the Restricted $SSID_1$ 140 can be assigned a preferred status 204 and the Guest $SSID_2$ 150 a non-preferred status 206. The preferred status 204 and non-preferred status 206 can be set via one or more configuration attributes, flags, parameters, fields, functions, etc. The preferred status 204 can inform the AP 110 that Restricted $SSID_1$ 140 should be given preference or priority when responding to requests (e.g., connection requests or probes) from the wireless clients 116, and the non-preferred status 206 can inform the AP 110 that Guest $SSID_2$ 150 should be given a lower preference or priority than the Restricted $SSID_1$ 140. The AP 110 can use the preference or priority information from the preferred status 204 and the non-preferred status 206 to select to advertise or broadcast the Restricted $SSID_1$ 140 before advertising or broadcasting the Guest $SSID_2$ 150, to respond to probes and requests for the Restricted $SSID_1$ 140 before responding to probes or requests for the Guest $SSID_2$ 150, or to attempt to first connect a wireless client to the Restricted $SSID_1$ 140 and withhold attempts to connect that wireless client to the Guest $SSID_2$ 150 until a threshold triggering event is detected (e.g., a predetermined period of time expires, a predetermined number of probe responses are received, a determination is made that the wireless client has failed to connect to the Restricted $SSID_1$ 140, etc.).

The AP 110 can perform steering decisions by first advertising or sending probe responses for a preferred wireless network before advertising or sending probe responses for a non-preferred wireless network (e.g., initially withholding advertising and probe responses for the non-preferred wireless network). Steering decisions can be based on one or more factors, such as a wireless network preference status; whether a client is known, authorized, or associated with a particular wireless network; whether a client has attempted or failed to connect to a particular wireless network; whether a client has previously connected to a particular wireless network; whether access to a particular wireless network has different requirements or restrictions than a different wireless network; etc.

The AP 110 can also implement various procedures or precautions to prevent the wireless client from being locked out of all wireless networks if the wireless client is unable to access or connect to a wireless network that the AP 110 has attempted to steer the wireless client to. For example, when a wireless client is not known by the AP 110 to be authorized for the Restricted $SSID_1$ 140, the AP 110 can allow the wireless client to access the Guest $SSID_2$ 150, assuming that the wireless client has the proper credentials for the Guest $SSID_2$ 150 (e.g., the correct shared password in the case of PSK authentication, the correct splash authorization code in the case of open/splash authentication, etc.). On the other hand, when the wireless client is known to be authorized or associated with the Restricted $SSID_1$ 140, the AP 110 can steer the wireless client to the Restricted $SSID_1$ 140. For example, the AP 110 can steer the wireless client by first transmitting probe responses for the Restricted $SSID_1$ 140, and/or withholding probe responses for the Guest $SSID_2$ 150 for a period of time. In some cases, the AP 110 can expire this state (e.g., steering attempts) after an amount of time to ensure that a broken or misconfigured wireless client can eventually attempt to connect to other wireless networks (e.g., Guest $SSID_2$ 150). The AP 110 can initially ignore probes as part of a steering process, but also issue responses within a given time constraint to avoid errors or timeouts.

In some cases, the AP 110 can check authorization prior, or in parallel, to responding to probes in order to identify which wireless network a wireless client should be steered to. For example, as further illustrated below, the AP 110 can check if the wireless client 116 is authorized for the Restricted $SSID_1$ 140, in order to first steer the wireless client 116 to the Restricted $SSID_1$ 140, if the wireless client 116 is indeed authorized for that network. However, depending on the authentication protocol implemented by a wireless network, the AP 110 may not have sufficient time to perform an authorization check without exceeding certain timing constraints. For example, the AP 110 may not be able to contact a $3^{rd}$-party server (e.g., a RADIUS server) to check authorization before responding to probes, without exceeding timing constraints. In such cases, the AP 110 can time or stagger different responses as described below, to avoid exceeding timing constraints.

To illustrate, if a wireless client 116 has never accessed any of the wireless networks deployed at the AP 110 (i.e., Restricted $SSID_1$ 140 and Guest $SSID_2$ 150), the AP 110 can initially ignore probe requests from the wireless client 116 in order to first determine authorization. In this example, the AP 110 can receive probe requests from the wireless client 116 and perform an authorization check (e.g., out-of-band (OOB) authorization) prior to responding to the wireless client 116. Thus, the AP 110 can ignore the initial probe requests while it obtains an authorization decision 208.

If the AP 110 is able to obtain an authorization decision 208 and determine whether the wireless client 116 is authorized to access the Restricted $SSID_1$ 140 and/or Guest $SSID_2$ 150, the AP 110 can record the authorization decision 208 indicating whether the wireless client 116 is authorized for the Restricted $SSID_1$ 140 and/or Guest $SSID_2$ 150, and select which wireless network to advertise to the wireless client 116 based on the authorization decision 208.

If a wireless client 116 is authorized for the Restricted $SSID_1$ 140, the AP 110 can first advertise the Restricted $SSID_1$ 140 to the wireless client 116. If the wireless client 116 is not authorized for the Restricted $SSID_1$ 140, the AP 110 can advertise the Guest $SSID_2$ 150 to that wireless client 116. This way, the AP 110 is able to steer the wireless client 116 to the specific wireless network the wireless client is authorized for.

If the Restricted $SSID_1$ 140 and/or the Guest $SSID_2$ 150 implement MAC-based authorization, the AP 110 can perform a respective authorization check quickly while avoiding or limiting timing issues, in order to efficiently identify what specific wireless network to steer the wireless client 116. Thus, if the wireless client 116 is authorized to access the Restricted $SSID_1$ 140, the AP 110 can first advertise the Restricted $SSID_1$ 140 and respond to requests associated with the Restricted $SSID_1$ 140 while at least initially withholding advertisements or responses to the Guest $SSID_2$ 150 in order to intelligently steer the wireless client 116 to the Restricted $SSID_1$ 140. If the wireless client 116 is unable to connect to the Restricted $SSID_1$ 140 (e.g., by obtaining a connection error or failing to connect or respond within a threshold period of time or number of requests/responses), the AP 110 can eventually advertise and/or respond for the Guest $SSID_2$ 150 to ensure the wireless client 116 is ultimately able to connect to a wireless network. The AP 110 can generate an alert or splash screen if it determines that an error has occurred such as, for example, the wireless client 116 has connected to the Guest $SSID_2$ 150, despite having access to the Restricted $SSID_1$ 140.

In some cases, the AP 110 may not be able to perform an authorization check within specific timing constraints. For example, the AP 110 may not be able to perform 802.1x authorization within a given timing constraint. In this example, the AP 110 may first respond to the wireless client's probe requests for the wireless network having the preferred status 204, which in this example is the Restricted $SSID_1$ 140. This can allow the AP 110 to first give the wireless client 116 an opportunity to connect to the preferred network, the Restricted $SSID_1$ 140. The AP 110 can continue to withhold probe responses for the Guest $SSID_2$ 150, and/or ignore requests from the wireless client 116 for the Guest $SSID_2$ 150, but eventually respond for the Guest $SSID_2$ 150 to avoid a timing constraint.

For example, the AP 110 can respond for the Restricted $SSID_1$ 140 after receiving a predetermined number of probe requests from the wireless client 116, and thereafter respond to all probe requests from the wireless client 116 after an additional period of time lapses or it receives an additional number of probe requests from the wireless client 116. Thus, if the wireless client 116 is unable to connect to the Restricted $SSID_1$ 140, and the AP 110 continues to receive probe requests from the wireless client 116, the AP 110 can respond for Guest $SSID_2$ 150 (as well as any other wireless network), as fallback to ensure the wireless client 116 is able to join another wireless network. Accordingly, the AP 110 can initially steer the wireless client 116 to the preferred network, Restricted $SSID_1$ 140, but also allow the wireless client 116 to eventually access another network, such as the Guest $SSID_2$ 150, if the wireless client 116 is misconfigured or experiences a problem connecting to the preferred network (i.e., Restricted $SSID_1$ 140).

By first responding for the preferred network (i.e., the Restricted $SSID_1$ 140) while withholding responses to the Guest $SSID_2$ 150, and only responding to the Guest $SSID_2$ 150 after an additional period of time or number of probe requests, the AP 110 can allow the wireless clients 116 to first attempt to connect to the preferred network (i.e., Restricted $SSID_1$ 140), and connect to the non-preferred network (i.e., Guest $SSID_2$ 150) only after the wireless client 116 is unable to access the preferred network. Such steering can work irrespective of any preferences or cached information at the wireless clients 116.

For example, in the case of 802.1x-based or similar authorization, the AP 110 can first respond for the Restricted $SSID_1$ 140, prompting the wireless clients 116 to attempt to access (at least eventually) the Restricted $SSID_1$ 140 even if the wireless clients 116 are configured to prefer the Guest $SSID_2$ 150. If the wireless clients 116 have the proper credentials or are otherwise authorized for the Restricted $SSID_1$ 140, they should be able to connect to the Restricted $SSID_1$ 140. If the wireless clients 116 are unable to connect to the Restricted $SSID_1$ 140 within a threshold (or obtain an access error or failure), the AP 110 can send probe responses for the Guest $SSID_2$ 150 to prompt or allow the wireless clients 116 to connect to another wireless network. The wireless clients 116 would eventually attempt to access the Guest $SSID_2$ 150 as an alternative.

Such steering mechanism can avoid problems or errors created from preferences or configuration data at the wireless clients 116. To illustrate, in FIG. 2, the wireless clients 116 store wireless configuration data 202A-B. The wireless configuration data 202A-B can include a cache of wireless networks previously accessed by the respective wireless clients 116; wireless network preferences or priorities; and/or wireless network configuration settings, such as credentials and protocol settings. In this example, wireless configuration data 202A contains a cache of wireless networks including the Restricted $SSID_1$ 140 and Guest $SSID_2$ 150, and may contain authorization credentials for the cached networks. Wireless configuration data 202A also has the Guest $SSID_2$ 150 set as a preferred wireless network, which would normally prompt the wireless client associated with the wireless configuration data 202A to prefer the Guest $SSID_2$ 150 over the Restricted $SSID_1$ 140. Accordingly, given the wireless configuration data 202A, that particular wireless client would normally attempt to connect to the Guest $SSID_2$ 150 before attempting to connect to the Restricted $SSID_1$ 140. As a result, the wireless client may automatically connect to the Guest $SSID_2$ 150, which may be configured to provide limited access to the network resources, even if the user prefers or intends to connect to the Restricted $SSID_1$ 140. In many cases, the user may be unaware that the wireless client has connected to the Guest $SSID_2$ 150. The user may then be unable to access a restricted network and may even generate an access error if the user attempts to access the restricted network resource. This can inconvenience the user and burden the network support staff.

With the steering mechanism described herein, the AP 110 can first send the wireless client a probe response associated with the Restricted $SSID_1$ 140 and withhold a response for the Guest $SSID_2$ 150. The wireless client would receive the probe response from the AP 110 for the Restricted $SSID_1$ 140, which should prompt the wireless client to at least eventually attempt to access the Restricted $SSID_1$ 140. The wireless configuration data 202A may contain the credentials for the Restricted $SSID_1$ 140 and may allow the wireless client to successfully connect to the Restricted $SSID_1$ 140. Thus, if successful, the wireless client will access the Restricted $SSID_1$ 140 and avoid the Guest $SSID_2$ 150, despite the wireless configuration data 202A at the wireless client preferring the Guest $SSID_2$ 150 over the Restricted $SSID_1$ 140.

The wireless configuration data 202B does not have a cache of wireless networks or any wireless network preference or configuration details. This may be because, for example, that particular wireless client has never accessed the Restricted $SSID_1$ 140 or Guest $SSID_2$ 150. In this case, the sequence of probe responses from the AP 110, the authorization requirements for the Restricted $SSID_1$ 140 and Guest $SSID_2$ 150, and/or the available authentication information for that particular wireless client can, among other factors, dictate which wireless network the wireless client will join first, or whether the wireless client will default to the Guest $SSID_2$ 150.

In some cases, a wireless client may have a broken or misconfigured wireless network setting (e.g., wireless configuration data 202A or 202B) which prevents the wireless client from accessing the Restricted $SSID_1$ 140. A wireless client may also have a blacklist of wireless networks which causes the wireless client to refuse to access the Restricted $SSID_1$ 140. For example, when the wireless client encounters a problem with a wireless network, it may add that wireless network to a blacklist to prevent future attempts to access that wireless network. Thus, the wireless client may have the Restricted $SSID_1$ 140 in a blacklist if it previously had problems connecting to that network. In any case, the wireless clients 116 can experience problems connecting to a particular network, such as the Restricted $SSID_1$ 140, for a variety of reasons. Accordingly, by eventually sending probe responses for the Guest $SSID_2$ 150 (and any other network), the AP 110 can allow the wireless client to access the Guest $SSID_2$ 150 and obtain some degree of connectivity even if the wireless client is unable to access the preferred network (i.e., Restricted $SSID_1$ 140).

The AP 110 can maintain and share information indicating the authorization state or history of the wireless clients 116. This can help the APs 110 make steering decisions for the wireless clients 116. For example, if a wireless client is able to access the Restricted $SSID_1$ 140 and successfully authenticates via a particular AP 110, the AP 110 can locally maintain a record indicating that the wireless client was able to authenticate and access the Restricted $SSID_1$ 140. The AP 110 can also report (e.g., gossip) to other nodes (e.g., APs 110, controller 104, etc.) in the network that the wireless client was successfully authenticated or authorized for the Restricted $SSID_1$ 140 and instruct the other nodes that the wireless client should be steered towards the Restricted $SSID_1$ 140. Thus, the APs 110 can use this information to steer the wireless client in future instances and, in some cases, automatically authenticate or authorize the wireless client.

If the wireless client, by contrast, is unable to successfully authenticate for the Restricted $SSID_1$ 140, the AP 110 can disconnect the wireless client (if connected) and locally record the event (i.e., failure to authenticate) for future knowledge (e.g., to avoid steering the wireless client to that specific network when receiving future probes from that wireless client). The AP 110 can also report (e.g., gossip) the authentication or authorization failure by the wireless client to the other nodes (e.g., APs 110, controller 104, etc.) to inform the other nodes that the authorization was not successful and the wireless client should be steered towards the Guest $SSID_2$ 150.

The information recorded, stored, and/or reported by the APs 110 can be aggregated from all the APs 110 to a central location to maintain a comprehensive record for the wireless networks (e.g., $SSID_1$ 140 and $SSID_2$ 150), the APs 110, and/or the wireless clients 116. In some cases, the APs 110 can maintain the information or records in a data store (e.g., MERAKI DSTORE), which can be maintained, accessed, and/or managed by the APs 110. In other cases, the APs 110 can report and/or store such information via a local controller (e.g., a state controller) or a remote controller (e.g., controller 104). The aggregated information or records of authorization or authentication events can allow the APs 110 to provide roaming functionality to wireless clients 116 by reducing latency, improving handoffs, and decreasing disruptions in communications as well as authorizations.

If a wireless client attempts to access a non-preferred network, such as the Guest $SSID_2$ 150, despite being marked or identified as authorized to access the preferred network, Restricted $SSID_1$ 140, the specific AP 110 receiving the access attempt (and/or the controller 104) can intercept the wireless client's initial request(s), such as the first HTTP request from the wireless client, and respond to the wireless client with a message or splash page explaining that the wireless client may be misconfigured. The message or splash page may also include information indicating steps that may be taken to resolve the issue. In addition, the AP 110 can record the event and generate a message or notification (e.g., email, dashboard information showing authorization and/or steering failure events, etc.). This can alert the client and user that an authorization issue has occurred and inform the user that the problem is related to authorization as opposed to a network issue. Such alert can also pre-emptively inform the network administrators so they quickly triage pertinent support cases.

Figure 3A:
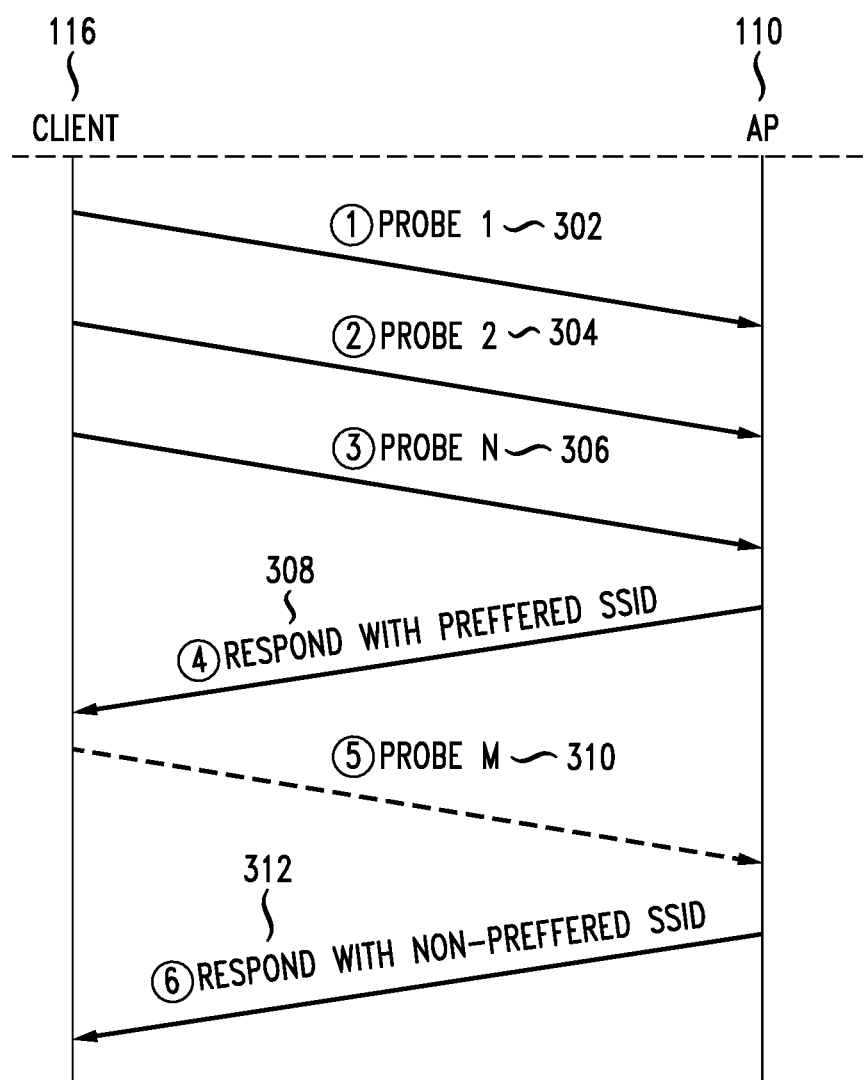
FIG. 3A illustrates a diagram of communications involved in an example wireless network steering procedure.

FIG. 3A illustrates a diagram of communications involved in an example wireless network steering procedure. Here, the wireless client 116 sends a probe 302 to the AP 110. The probe 302 can request information about wireless networks available at AP 110. The probe 302 can inform the AP 110 that wireless client 116 is attempting to access a wireless network through AP 110. In response to probe 302, the AP 110 can check if steering is enabled or configured at the AP 110, if any wireless networks are set as preferred for steering at the AP 110, if the wireless client 116 has been previously authorized for a particular wireless network or has previously failed to obtain authorization or access to a particular wireless network, and/or if AP 110 can confirm whether the wireless client 116 should be authorized for a particular wireless network.

If steering is enabled or configured and/or a particular wireless network is set as preferred, the AP 110 can withhold responding to probe 302 or advertising wireless networks to the wireless client 116 until a steering decision is made by AP 110 (e.g., which wireless network the wireless client 116 should be steered to, etc.). In the meantime, the wireless client 116 may continue to send probes 304, 306 to the AP 110. After a predetermined number of probes (e.g., probes 1–N), the AP 110 can first send response 308 for the preferred SSID. The preferred SSID can be the wireless network set as preferred vis-à-vis other wireless networks at the AP 110, and/or the wireless network at the AP 110 identified as preferred based on the permissions and/or network authorizations associated with the wireless client 116. For example, in some cases, the preferred SSID can correspond to a particular wireless network that the wireless client 116 is authorized, or has been previously authorized, to access. In other cases, if the AP 110 is unable to determine whether the wireless client 116 is authorized, or has been previously authorized, for a particular wireless network, the preferred SSID can be a specific wireless network configured to be a preferred network, irrespective of the authorization state of the wireless client 116.

The response 308 can provide the wireless client 116 with information for establishing access to the preferred SSID. In some cases, the wireless client 116 may attempt to access the preferred SSID in response to the response 308 from the AP 110. If the wireless client 116 is able to provide the proper credentials to the AP 110 for the preferred SSID, or the AP 110 is able to otherwise authorize or authenticate the wireless client 116 (e.g., by checking previous authorization records, performing out-of-band authentication, etc.), the wireless client 116 will be able to access the preferred SSID and the AP 110 will be able to prevent the wireless client 116 from accessing a different, non-preferred network.

If the wireless client 116 is unable to access the preferred SSID, it can send additional probes 310 to AP 110. The additional probes 310 may allow the wireless client 116 to attempt to access other wireless networks at the AP 110, such as a guest wireless network or guest SSID. After receiving a threshold number of additional probes from the wireless client 116 (e.g., M probes), the AP 110 can send response 312 for one or more non-preferred SSIDs. The non-preferred SSID can include, for example, one or more guest or open wireless networks at the AP 110, as well as any other wireless network, including restricted networks, at the AP 110. Non-limiting examples of non-preferred wireless networks can include networks configured as non-preferred networks at the AP 110, networks identified as non-preferred specifically for the wireless client 116 (e.g., based on previous events and information associated with the wireless client 116, such as authorization failure events, etc.), networks that do not have a preference status or setting at the AP 110, etc. The response 312 can trigger or prompt the wireless client 116 to attempt to access the non-preferred wireless network(s) if the wireless client 116 is otherwise unable to access the preferred SSID.

Figure 3B:
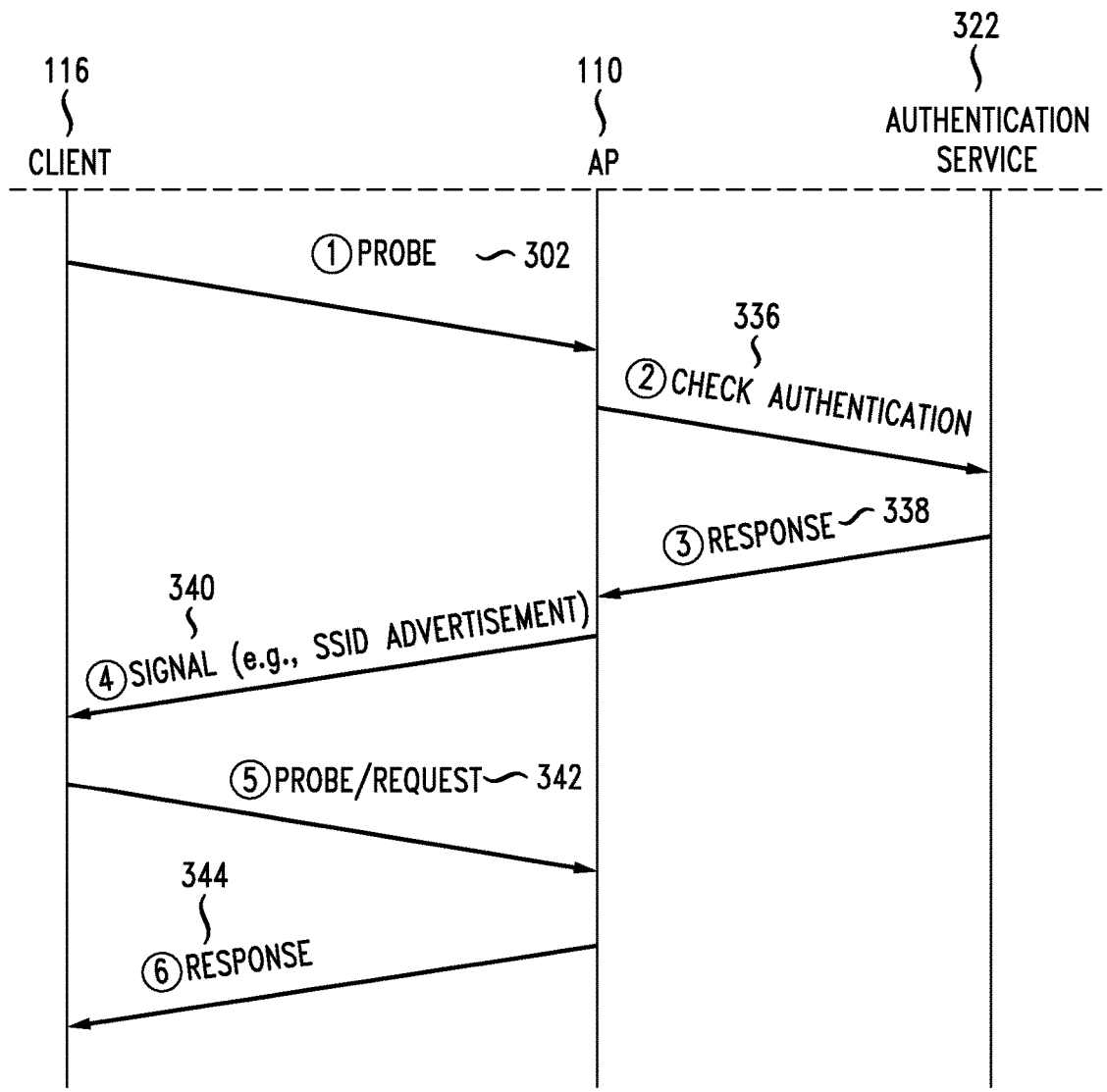
FIG. 3B illustrates a diagram of communications involved in another example wireless network steering procedure.

FIG. 3B illustrates a diagram of communications involved in another example wireless network steering procedure. The steering procedure in this example can involve an authorization check by the AP 110 to identify any wireless network(s) the wireless client 116 is authorized to access and/or determine which wireless network(s) the wireless client 116 should be steered towards.

In this example, the wireless client 116 sends the probe 302 as previously described with reference to FIG. 3A. After receiving the probe 302, the AP 110 can send an authorization request 336 to an Authentication Service 332. The authorization request 336 can identify the wireless client 116 (e.g., via a MAC address, a key, a code, an identifier, etc.) to the authentication service 332 and ask whether the wireless client 116 is authorized to access any wireless networks at the AP 110. The authentication service 332 can be a separate device, such as a remote server, or an application or function at the AP 110, configured to perform authentication or authorization for users and/or devices.

The authentication service 332 can check whether the wireless client 116 is authorized to access any wireless networks and send an authorization response 338 to the AP 110. The authorization response 338 can indicate whether the wireless client 116 is authorized, or has been previously authorized, to access any particular wireless network(s) and identify the specific wireless network(s). In some cases, the authorization response 338 can also, or instead, indicate whether the wireless client 116 has attempted to access, or failed to obtain authorization for, any particular wireless networks.

For example, the authentication service 332 can perform MAC-based authorization to quickly identify whether the wireless client 116 is authorized for a particular wireless network at the AP 110. The authentication service 332 can then send the authorization response 338 to the AP 110 indicating the results of the MAC-based authorization performed by the authentication service 332.

In some cases, the AP 110 can ignore any probes from the wireless client 116 received while the AP 110 is checking authorization. For example, the wireless client 116 can send the probe 302 prompting the AP 110 to send the authorization request 336 to the authentication service 332 in order to initiate an authorization check. The wireless client 116 may send additional probes to the AP 110 during the authorization check (e.g., after sending the probe 302, and prior to the response 338 and/or a response to the wireless client 116 from the AP 110). In this case, the AP 110 can ignore the additional probes from the wireless client 116 and withhold any probe responses to the wireless client 116 until the AP 110 receives the response 338 and/or a threshold occurs (e.g., a threshold period of time expires, the AP 110 receives a threshold number of additional probes, etc.).

After receiving the response 338, the AP 110 can send the signal 340 to the wireless client 116. The signal 340 can advertise a specific wireless network (i.e., SSID) to the wireless client 116 based on the response 338. For example, the signal 340 can advertise a wireless network configured as a preferred wireless network and/or a wireless network which, according to the response 338, the wireless client 116 is, or has been, authorized to access. To illustrate, if the response 338 indicates that the wireless client 116 is authorized for the Restricted $SSID_1$ 140, the signal 340 can advertise the Restricted $SSID_1$ 140 to the wireless client 116. The AP 110 can withhold responding with or advertising other wireless networks or SSIDs in order to steer the wireless client 116 to the wireless network the wireless client 116 is authorized for, which in this example is the Restricted $SSID_1$ 140.

The wireless client 116 can send signal 342 to the AP 110. In some cases, signal 342 can be a response to signal 340, such as a request to access the wireless network identified by signal 340. In other cases, signal 342 may be another probe request from the wireless client 116. For example, if the wireless client 116 does not recognize the wireless network identified by signal 340, refuses to access the wireless network identified by signal 340, is unable to access the wireless network identified by signal 340, etc., it may send additional probe requests to probe for other wireless networks.

The AP 110 can send response 344 to the wireless client 116. For example, if signal 342 is a probe request, the response 344 can be a probe response identified one or more other wireless networks or SSIDs which the wireless client 116 attempt to access. If signal 342 is a request to access the wireless network or SSID identified by signal 340, then the response 344 can be part of an exchange between the wireless client 116 and the AP 110 for establishing access for the wireless client 116 to the wireless network or SSID associated with the request 342 from the wireless client 116.

Figure 4:
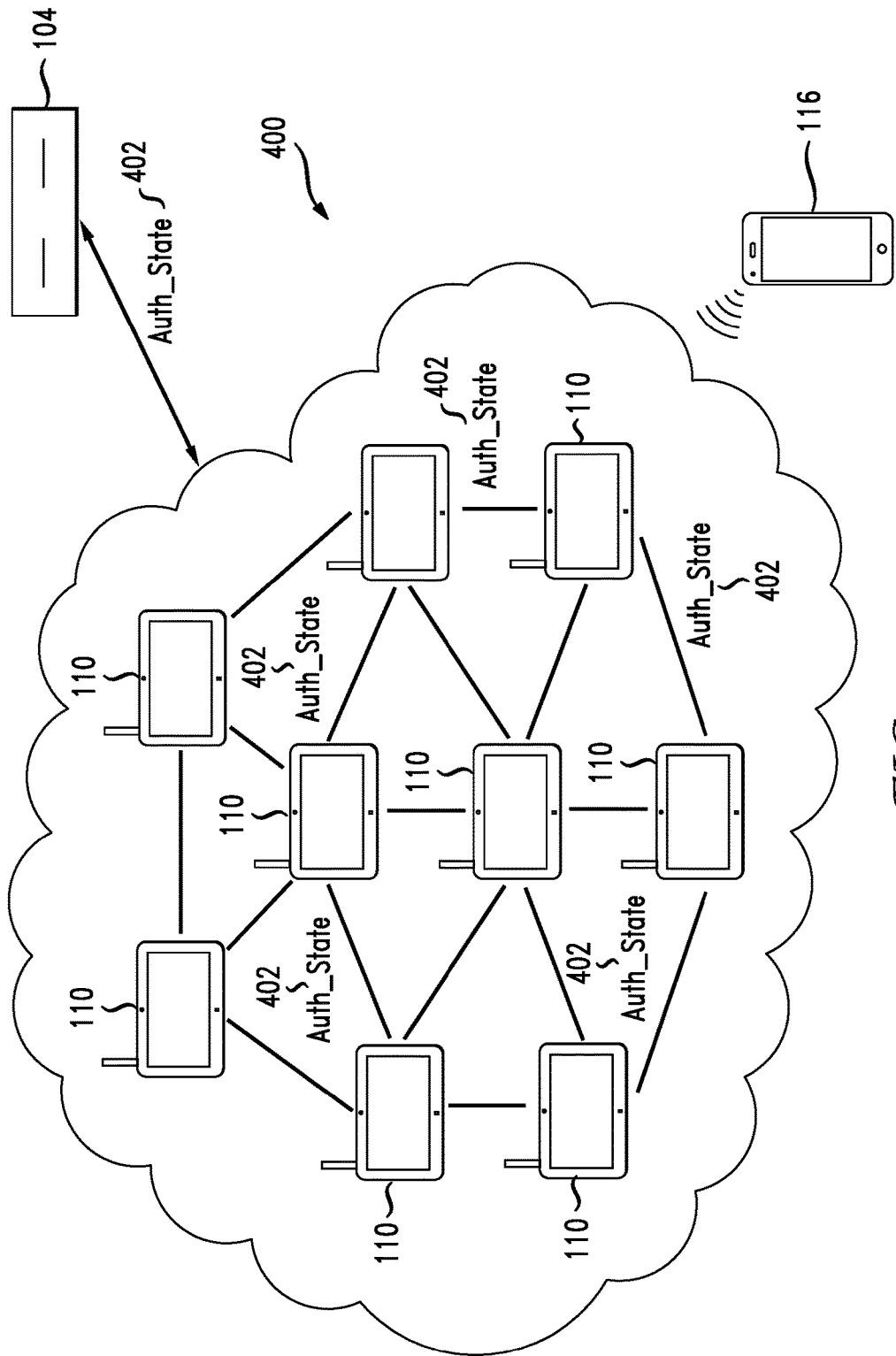
FIG. 4 illustrates a diagram of an example gossip system 400 for storing authorization data for one or more wireless networks.

FIG. 4 illustrates a diagram of an example gossip system 400 for storing authorization data for one or more wireless networks. The APs 110 can include the various access points in a network. In this example, the APs 110 can exchange authorization data 402 to synchronize authorization state information and updates between the APs 110. For example, when a particular AP 110 makes an authorization determination for wireless client 116, it can record the authorization state or information for wireless client 116 and gossip the information to the other APs 110.

In some cases, the APs 110 can each locally store the aggregated authorization information from the authorization data 402 of all APs 110. In other cases, the APs 110 can host a data store of information accessible by the APs 110, which can include the aggregated authorization information from the APs 110. For example, the APs 110 can be implemented to form a distributed data store containing authorization information, as well as any other relevant data. The distributed data store can work as a single logical data store that is formed using physical memory and/or storage distributed across multiple APs 110.

In some cases, the authorization information can be reported to, and stored at, the controller 104. For example, the APs 110 can report the authorization data 402 to the controller 104, which can maintain a centralized and aggregated collection of the authorization data 402 from the APs 110. The controller 104 can be a remote controller (e.g., a controller on the cloud or a remote network) as illustrated in FIG. 1A. However, in some cases, the controller 104 can be a local controller (e.g., a controller on the same network as the APs 110).

The aggregated authorization state and information can be accessible to the APs 110 when interacting with wireless clients 116. The APs 110 can use the authorization state and information to quickly verify authorization for specific wireless clients. This authorization verification can decrease the time and latency involved in other authorization approaches, such as a full 802.1x authorization procedure, by allowing the APs 110 to simply confirm authorization through the authorization state and information stored and synchronized through the gossip system 400 without necessarily having to perform a full authorization procedure. This authorization verification approach can enable the APs 110 to quickly identify authorization information and wireless network associations for specific wireless clients probing the APs 110 for wireless networks, in order to steer the specific wireless clients to a particular wireless network and avoid or limit timeouts. The authorization verification approach can also facilitate client roaming by decreasing the amount of time spent or required by the APs 110 when performing authorizations and handoffs of roaming clients.

Figure 5:
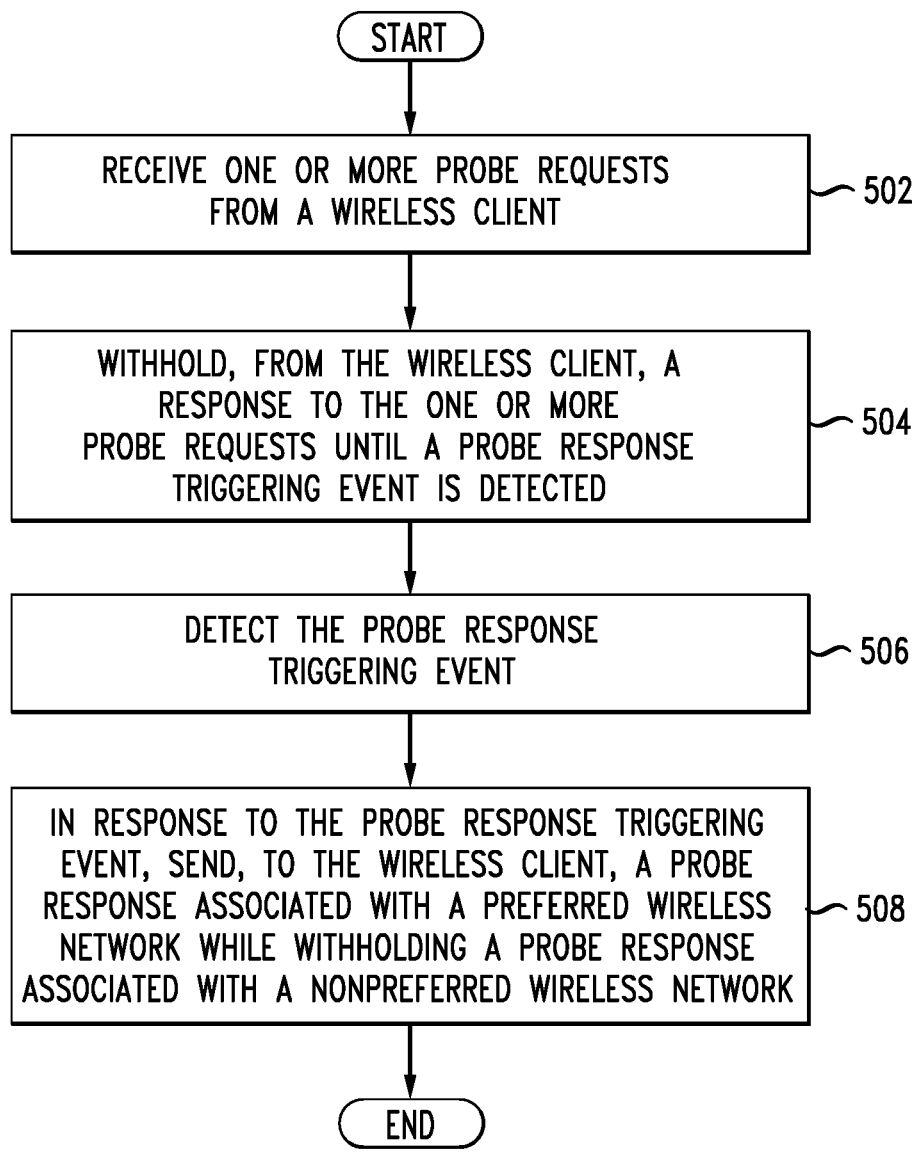
FIG. 5 illustrates an example method for steering wireless clients to specific wireless networks.

Having disclosed example system components and concepts, the disclosure now turns to the example method shown in FIG. 5. For the sake of clarity, the method is described with reference to the APs 110 and wireless clients 116, as shown in FIGS. 1A-B, configured to perform the various steps in the method. The steps outlined herein are examples and can be implemented in any combination thereof, including combinations that exclude, add, or modify certain steps.

In this example method, the AP 110 can include multiple wireless networks, such as the Restricted $SSID_1$ 140 and Guest $SSID_2$ 150. The AP 110 can be configured to steer wireless clients 116 to a preferred wireless network over one or more other or non-preferred wireless networks. In this example, the Restricted $SSID_1$ 140 can represent the preferred network. The AP 110 can steer wireless clients 116 to the Restricted $SSID_1$ 140 when such clients are known or authorized for the Restricted $SSID_1$ 140.

The method can begin at step 502, when the AP 110 receives one or more probe requests from a wireless client. At step 504, the AP 110 withholds, from the wireless client, a response to the one or more probe requests until a probe response triggering event is detected. At step 506, the AP 110 detects the probe response triggering event and, in response to the probe response triggering event, at step 508, the AP 110 can send to the wireless client a probe response associated with the preferred wireless (i.e., the Restricted $SSID_1$ 140) while withholding a probe response associated with the non-preferred wireless network (i.e., the Guest $SSID_1$ 150).

The probe response triggering event can allow the AP 110 to identify when to respond to the wireless client and/or how to respond to the wireless client in order to steer the wireless client to a specific wireless network. For example, the probe response triggering event can be a determination that the wireless client is authorized for the Restricted $SSID_1$ 140. Here, the AP 110 can perform an authorization check, and a determination that the wireless client is authorized for the Restricted $SSID_1$ 140 can trigger the AP 110 to respond specifically for the Restricted $SSID_1$ 140. The probe response triggering event may consequently allow the AP 110 to target the Restricted $SSID_1$ 140 and steer the wireless client toward the Restricted $SSID_1$ 140, since the wireless client is known to be authorized for the Restricted $SSID_1$ 140, while limiting the wireless client's opportunity to instead select and join the Guest $SSID_1$ 150.

As another example, the probe triggering event can result from receiving a threshold number of probe requests from the wireless client. For example, the AP 110 can withhold a probe response to the wireless client for both the Restricted $SSID_1$ 140 and the Guest $SSID_1$ 150 to prevent the wireless client from accessing the wrong or unintended wireless network. After receiving a number of probe requests, the AP 110 can then respond first for the Restricted $SSID_1$ 140. The number of probe requests that trigger the first response can provide some delay for intelligently steering the wireless client without exceeding a timing constraint. The AP 110 can be configured to subsequently respond for any other wireless networks, such as the Guest $SSID_1$ 150, if it receives a number of additional probe requests from the wireless client. This way, the AP 110 can enable the wireless client to access other wireless networks (e.g., the Guest $SSID_1$ 150) if otherwise unable to access the Restricted $SSID_1$ 140.

In some cases, the AP 110 can determine if the wireless client is misconfigured or is not behaving as expected. For example, the AP 110 can determine that the wireless client is authorized to access the Restricted $SSID_1$ 140. If the AP 110 detects a request by the wireless client to access the Guest $SSID_1$ 150 despite the wireless client being authorized to access the Restricted $SSID_1$ 140, the AP 110 can generate a notification for the wireless client indicating that the wireless client has a network configuration problem. To illustrate, the AP 110 can detect an HTTP request from the wireless client to access the Guest $SSID_1$ 150. If the wireless client is authorized to access the Restricted $SSID_1$ 140, the AP 110 can intercept the HTTP request from the wireless client and respond with an HTTP redirect and terminate the TCP flow. The HTTP redirect can redirect the wireless client to a splash page that indicates to the wireless client that a problem has occurred (e.g., the wireless client has a network configuration problem). Thus, the splash page can alert the wireless client that an issue exists in order to allow the wireless client to potentially resolve the issue.

The splash page can include one or more selectable interface elements providing specific options to the wireless client for addressing the configuration issue. For example, the splash page can include an option to alert a system administrator or support technician that the wireless client experienced a configuration issue, or an option to allow the user at the wireless client to instead attempt to access the Restricted $SSID_1$ 140 or update wireless network settings on the wireless client.

The disclosure now turns to FIGS. 6 and 7, which illustrate example network devices and computing devices, such as switches, routers, load balancers, client devices, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:
1. A system comprising:
one or more processors; and at least one computer-readable storage medium having stored therein instructions which, when executed by the one or more processors, cause the system to:
  receive one or more probe requests sent from a wireless client, the one or more probe requests requesting wireless network information from the system, the system being associated with a preferred wireless network and a non-preferred wireless network;
  withhold a first probe response associated with the preferred wireless network until a first predetermined number of probe requests are received from the wireless client and a second probe response associated with the non-preferred wireless network until a second predetermined number of probe requests are received from the wireless client, the second predetermined number being greater than the first predetermined number; and
  in response to receiving the first predetermined number of probe requests from the wireless client, send the first probe response associated with the preferred wireless network to the wireless client;
  receive the second predetermined number of probe requests from the wireless client; and
  in response to receiving the second predetermined number of probe requests from the wireless client, send the second probe response associated with the non-preferred wireless network;
  determine that the wireless client is authorized to access the preferred wireless network;
  detect a request by the wireless client to access the non-preferred wireless network; and
  in response to detecting the request by the wireless client to access the non-preferred wireless network and determining that the wireless client is authorized to access the preferred wireless network, intercept the request by the wireless client to access the non-preferred wireless network and redirect the wireless client to a splash page comprising a notification indicating that the wireless client has a network configuration problem;
  wherein receiving the second predetermined number of probe requests after the first predetermined number of probe requests reflects a failure of the wireless client to connect with the preferred wireless network such that the system continues to receive probe requests after sending the first probe response.

2. The system of claim 1, wherein withholding the first probe response and the second probe response comprises:
  prior to responding to the one or more probe requests from the wireless client, determine whether the wireless client is authorized to access the preferred wireless network via one or more authorization policies.

3. The system of claim 2, the at least one computer-readable storage medium storing additional instructions which, when executed by the one or more processors, cause the system to:
  determine that that wireless client is authorized to access the preferred network via the one or more authorization policies; and
  in response to determining that the wireless client is authorized to access the preferred network, send to the wireless client a signal advertising one or more wireless networks associated with the system, the one or more wireless networks comprising the preferred wireless network and excluding the non-preferred wireless network.

4. The system of claim 2, the at least one computer-readable storage medium storing additional instructions which, when executed by the one or more processors, cause the system to:
  determine that that wireless client is not authorized to access the preferred network via the one or more authorization policies; and
  in response to determining that the wireless client is not authorized to access the preferred network, sending to the wireless client a signal advertising one or more wireless networks associated with the system, the one or more wireless networks comprising the non-preferred wireless network and excluding the preferred wireless network.

5. The system of claim 2, the at least one computer-readable storage medium storing additional instructions which, when executed by the one or more processors, cause the system to:
  determine that the wireless client has not accessed the preferred wireless network after the second predetermined number of probe requests; and
  in response to determining that the wireless client has not accessed the preferred wireless network after the second predetermined number of probe requests, advertise the non-preferred wireless network to the wireless client.

6. The system of claim 1, the at least one computer-readable storage medium storing additional instructions which, when executed by the one or more processors, cause the system to:
  determine whether the wireless client is authorized to access the preferred wireless network to yield client-network authorization information;
  store the client-network authorization information; and
  based on the client-network authorization information, send a notification to one or more nodes associated with the preferred wireless network, the notification indicating whether the wireless client is authorized to access the preferred wireless network.

7. A non-transitory computer-readable storage medium having stored therein instructions which, when executed by one or more processors associated with an access point, cause the access point to perform operations comprising:
  receive one or more probe requests from a wireless client requesting wireless network information from the access point, the access point being associated with a preferred wireless network and a non-preferred wireless network;
  withhold, from the wireless client, a first probe response associated with the preferred wireless network and a second probe response associated with the non-preferred wireless network;
  receive one or more additional probe requests from the wireless client;
  when a total number of probe requests received from the wireless client is greater than a first predetermined number of probe requests and less than a second predetermined number of probe requests:
    send the first probe response associated with the preferred wireless network to the wireless client; and
    continue to withhold from the wireless client the second probe response associated with the non-preferred wireless network; and
  in response to the total number of probe requests received from the wireless client is greater than the second predetermined number of probe requests, send the second probe response associated with the non-preferred wireless network to the wireless client;
determine that the wireless client is authorized to access the preferred wireless network;
detect a request by the wireless client to access the non-preferred wireless network; and
in response to detecting the request by the wireless client to access the non-preferred wireless network and determining that the wireless client is authorized to access the preferred wireless network, intercept the request by the wireless client to access the non-preferred wireless network and redirect the wireless client to a splash page comprising a notification indicating that the wireless client has a network configuration problem;
wherein receiving more than the second predetermined number of probe requests after receipt of the first predetermined number of probe requests reflects a failure of the wireless client to connect with the preferred wireless network such that the access point continues to receive probe requests after sending the first probe response.

8. The non-transitory computer-readable storage medium of claim 7, wherein withholding the first probe response and the second probe response comprises:
prior to sending the first probe response and the second probe response to the wireless client, determine whether the wireless client is authorized to access the preferred wireless network via one or more authorization policies; and
advertise to the wireless client one of the preferred wireless network or the non-preferred wireless network based on whether the wireless client is authorized to access the preferred wireless network via one or more authorization policies.

9. The medium of claim 8, the operations further comprising:
determine that that wireless client is not authorized to access the preferred network via the one or more authorization policies; and
in response to determining that the wireless client is not authorized to access the preferred network, sending to the wireless client a signal advertising one or more wireless networks associated with the access point, the one or more wireless networks comprising the non-preferred wireless network and excluding the preferred wireless network.

10. The medium of claim 8, the operations further comprising:
determine that the wireless client has not accessed the preferred wireless network after the second predetermined number of probe requests; and
in response to determining that the wireless client has not accessed the preferred wireless network after the second predetermined number of probe requests, advertise the non-preferred wireless network to the wireless client.

11. The medium of claim 8, the operations further comprising:
determine whether the wireless client is authorized to access the preferred wireless network to yield client-network authorization information;
store the client-network authorization information; and
based on the client-network authorization information, send a notification to one or more nodes associated with the preferred wireless network, the notification indicating whether the wireless client is authorized to access the preferred wireless network.

12. A method comprising:
receiving one or more probe requests sent from a wireless client, the one or more probe requests requesting wireless network information from a system, the system being associated with a preferred wireless network and a non-preferred wireless network;
withholding a first probe response associated with the preferred wireless network until a first predetermined number of probe requests are received from the wireless client and a second probe response associated with the non-preferred wireless network until a second predetermined number of probe requests are received from the wireless client, the second predetermined number being greater than the first predetermined number; and
in response to receiving the first predetermined number of probe requests from the wireless client, sending the first probe response associated with the preferred wireless network to the wireless client;
receiving the second predetermined number of probe requests from the wireless client; and
in response to receiving the second predetermined number of probe requests from the wireless client, sending the second probe response associated with the non-preferred wireless network;
determining that the wireless client is authorized to access the preferred wireless network;
detecting a request by the wireless client to access the non-preferred wireless network; and
in response to detecting the request by the wireless client to access the non-preferred wireless network and determining that the wireless client is authorized to access the preferred wireless network, intercepting the request by the wireless client to access the non-preferred wireless network and redirect the wireless client to a splash page comprising a notification indicating that the wireless client has a network configuration problem;
wherein receiving the second predetermined number of probe requests after the first predetermined number of probe requests reflects a failure of the wireless client to connect with the preferred wireless network such that the system continues to receive probe requests after sending the first probe response.

13. The method of claim 12, wherein withholding the first probe response and the second probe response comprises:
prior to responding to the one or more probe requests from the wireless client, determining whether the wireless client is authorized to access the preferred wireless network via one or more authorization policies.

14. The method of claim 13, further comprising:
in response to a positive resulting of the determining that the wireless client is authorized to access the preferred network, sending to the wireless client a signal advertising one or more wireless networks associated with the system, the one or more wireless networks comprising the preferred wireless network and excluding the non-preferred wireless network.

15. The method of claim 13, further comprising:
in response to a negative result of the determining, sending to the wireless client a signal advertising one or more wireless networks associated with the system, the one or more wireless networks comprising the non-preferred wireless network and excluding the preferred wireless network.

16. The method of claim 13, further comprising:
in response to determining that the wireless client has not accessed the preferred wireless network after the second predetermined number of probe requests, advertise the non-preferred wireless network to the wireless client.

17. The method of claim 13, further comprising:

determining whether the wireless client is authorized to access the preferred wireless network to yield client-network authorization information;

storing the client-network authorization information; and based on the client-network authorization information, sending a notification to one or more nodes associated with the preferred wireless network, the notification indicating whether the wireless client is authorized to access the preferred wireless network.

\* \* \* \* \*